July 4, 1939.  H. M. KELSO, JR  2,164,925

TEXTILE FABRIC

Filed Dec. 17, 1936

Inventor:
Harrison M. Kelso, Jr.
By Frank H. Marko, Atty.

Patented July 4, 1939

2,164,925

UNITED STATES PATENT OFFICE 2,164,925

TEXTILE FABRIC

Harrison M. Kelso, Jr., Evanston, Ill., assignor to Sears, Roebuck and Co., Chicago, Ill., a corporation of New York Application December 17, 1936, Serial No. 116,337

6 Claims. (Cl. 139—383)

My invention relates to textile fabrics, and has to do more particularly with an improved bed sheet which is so constructed as to give longer life than an ordinary article of this class.

It is found that when sheets are laundered by modern methods, they are subjected to excessive wear adjacent the longitudinal edges thereof, due principally to the effect of mangling. In putting a sheet through a mangle, it is presented along a longitudinal edge, and early in the life of a sheet creasing inevitably occurs adjacent the edge which is presented to the mangle. After repeated mangling the sheet fails along said creases. I have found after extensive investigation that such failures are due almost entirely to the breakage of the warp threads.

Efforts have been made to strengthen sheets and like fabrics by increasing the count of warp, or longitudinal threads, but I have found such attempts to be unsuccessful for several reasons. Such constructions, for one thing, tend to produce a puckering in the sheet which is not only unsightly, but destroys the object of the reinforcement by increasing the probability of creasing in the mangling operation.

According to my present invention, a sheet is reinforced by the use of multi-ply warp threads in the area which is to be reinforced. By this means the life of the fabric is substantially increased, while there is no detraction from the appearance; in other words, there is no puckering or other unsightly or disadvantageous effect, as in the case where the thread count is increased.

Figure 1:
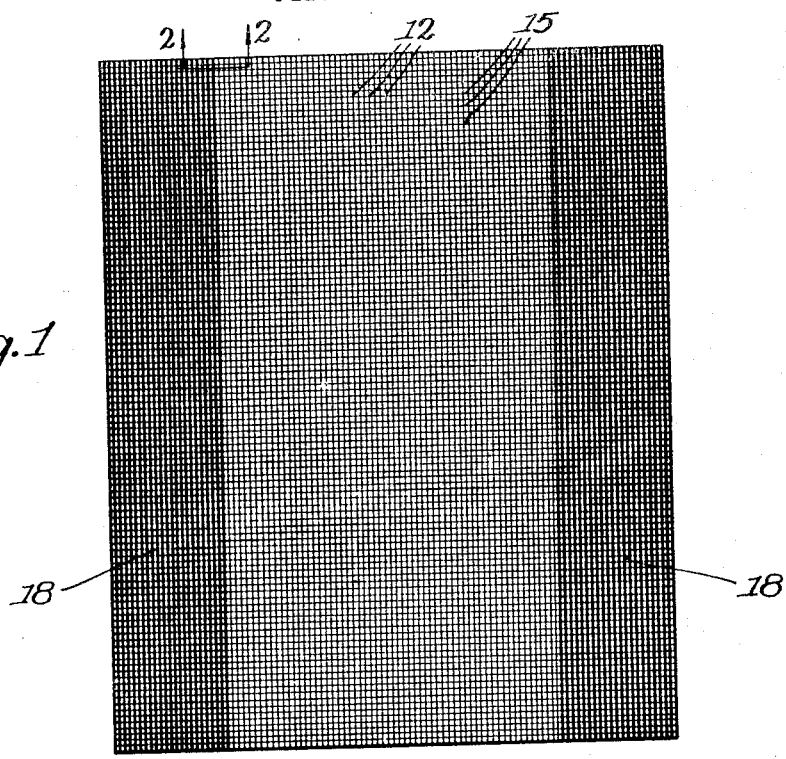
Figure 2:
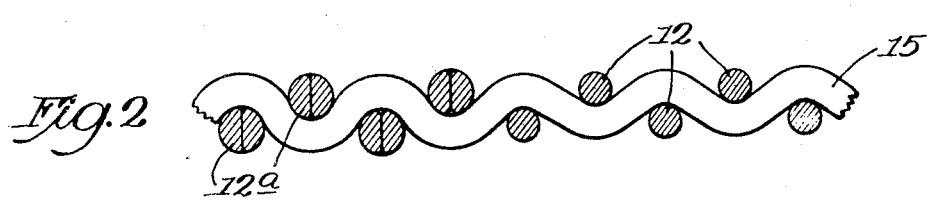
Figure 3:
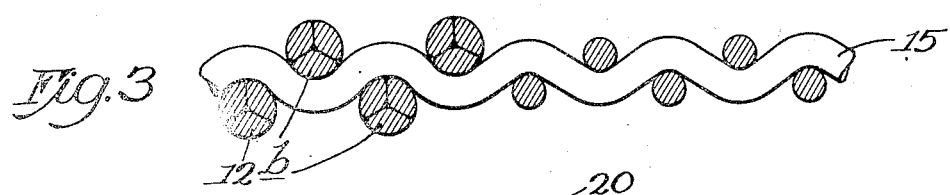
Figure 4:
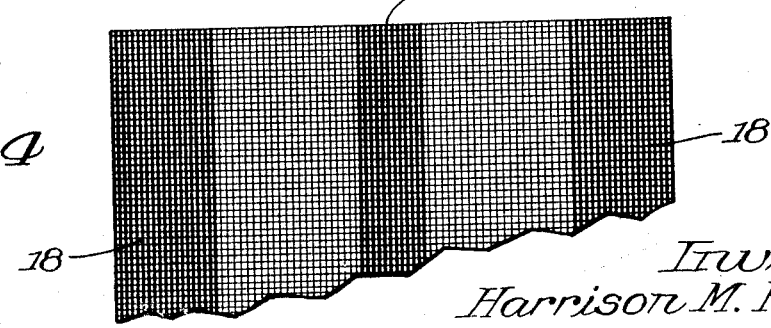

Referring, now, to the drawing forming a part of this specification and illustrating a preferred embodiment of my invention, Fig. 1 is a plan view on an exaggerated scale of a bed sheet embodying my invention, Fig. 2 is a sectional view taken substantially along the line of 2—2 of Fig. 1, on a greatly magnified scale, Fig. 3 is a sectional view similar to Fig. 2 and showing a modified form of my invention, and Fig. 4 is a view similar to Fig. 1 and showing another modification of my invention.

The sheet shown in Fig. 1 is formed of a plurality of warp or longitudinal threads 12 and a plurality of woof or transverse threads 15. As shown best in Fig. 2, the woof threads 15 are uniformly single-ply. The warp threads in areas 18 extending for a substantial width adjacent the longitudinal edges 18, 18 are multi-ply; for example, they may be two-ply threads 12a, as shown in Fig. 2, or three-ply threads 12b, as shown in Fig. 3. The warp threads 12 between the reinforced areas 18 are preferably single-ply.

In the embodiment shown in Fig. 4 an additional reinforced area 20 is provided adjacent the longitudinal center line of the sheet to provide for the wear incident to home ironing. In such areas 20 the warp threads are likewise of multi-ply construction.

It will be understood that in all the embodiments the number of warp threads per unit of linear measurement is preferably uniform or substantially uniform throughout the entire width of the sheet, i. e., in the reinforced areas as well as the non-reinforced areas. For example, I may use 64 threads per inch for the warp threads and the same number for the woof threads. However, it will be understood that this is merely given by way of example.

By means of the construction shown, sheets are found to have a substantially longer life than ordinary sheets, or sheets otherwise reinforced.

Various other changes coming within the spirit of my invention may suggest themselves to those skilled in the art, and, hence, I do not wish to be limited to the specific forms shown or uses mentioned, except to the extent indicated in the appended claims, which are to be interpreted as broadly as the state of the art will permit.

I claim:

1. A woven sheet having a substantially uniform number of warp threads per unit of linear measurement throughout its entire width, and having reinforced strengthened areas adjacent its longitudinal edges, the warp threads in said areas each consisting of a relatively greater number of plies, and being of greater strength than the threads in the area therebetween.

2. A woven sheet having a substantially uniform number of warp threads per unit of linear measurement throughout its entire width, and having reinforced strengthened areas adjacent its longitudinal edges, the warp threads in said areas each consisting of a plurality of plies, and being of greater strength than the single ply threads in the area therebetween.

3. A woven sheet having a substantially uniform number of warp threads, and a substantially uniform number of single ply woof threads, per unit of linear measurement throughout its entire width and length, and having reinforced strengthened areas adjacent its edges, the warp threads in said areas each consisting of a plurality of plies, and being of greater strength than the single ply threads in the area therebetween.

4. A woven sheet having a substantially uniform number of warp threads per unit of linear measurement throughout its entire width, and having reinforced strengthened areas adjacent its longitudinal edges, and in the longitudinal center of the sheet, the warp threads in said areas consisting of a relatively greater number of plies, and being of greater strength than the threads in the intervening areas.

5. A woven sheet having a substantially uniform number of warp threads per unit of linear measurement throughout its entire width, and having reinforced strengthened areas adjacent its longitudinal edges, the warp threads in said areas each consisting of a relatively greater number of plies, and being of greater strength than the threads in the area immediately inwardly thereadjacent, the first-mentioned set of threads being uniformly of the same number of plies, and the second-mentioned set of threads being uniformly of the same number of plies, the woof threads being uniformly of the same number of plies as the second-mentioned set of threads, and consisting of a substantially uniform number of threads per unit of linear measurement throughout the entire length of the sheet.

6. A woven sheet having a substantially uniform number of warp threads per unit of linear measurement throughout its entire width, and having reinforced strengthened areas adjacent its longitudinal edges, and in the longitudinal center of the sheet, the warp threads in said areas each consisting of a relatively greater number of plies and being of greater strength than the threads in the intervening areas, the first-mentioned set of threads being uniformly of the same number of plies, and the second-mentioned set of threads being uniformly of the same number of plies, the woof threads being uniformly of the same number of plies as the second-mentioned set of threads and consisting of a substantially uniform number of threads per unit of linear measurement throughout the entire length of the sheet.

HARRISON M. KELSO, Jr.